(No Model.)
B. ANDERSON.
ELECTRODE FOR SECONDARY BATTERIES.
No. 454,818. Patented June 23, 1891.
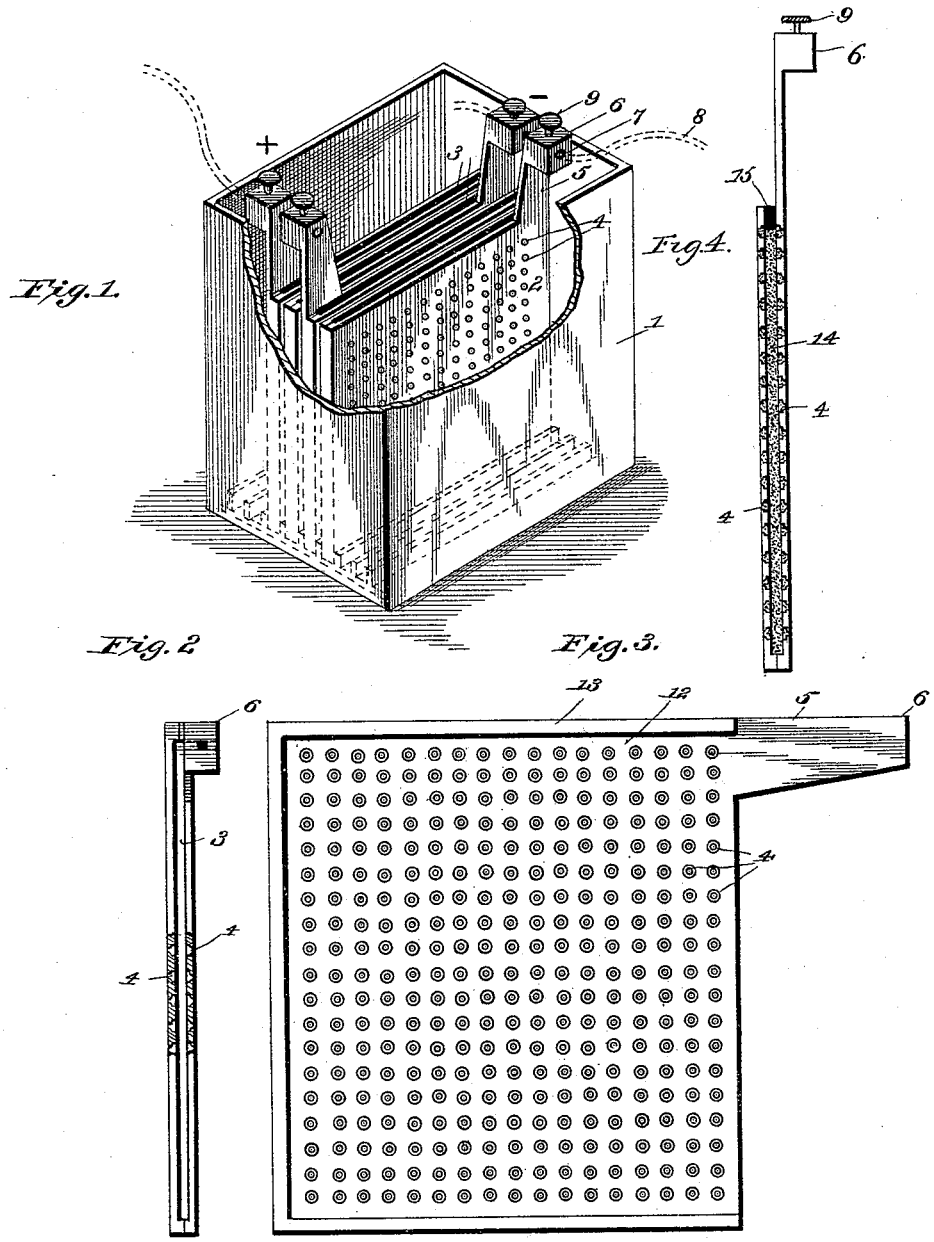

UNITED STATES PATENT OFFICE.

BOYD ANDERSON, OF TEXARKANA, TEXAS.

ELECTRODE FOR SECONDARY BATTERIES.

SPECIFICATION forming part of Letters Patent No. 454,818, dated June 23, 1891.

Application filed September 29, 1890. Serial No. 366,586. (No model.)

*To all whom it may concern:*

Be it known that I, BOYD ANDERSON, a citizen of the United States, residing at Texarkana, in the county of Bowie and State of Texas, have invented new and useful Improvements in the Manufacture of Electrodes for Storage-Batteries, of which the following is a specification.

This invention relates to the manufacture of electrodes for storage batteries or accumulators; and it consists in certain improvements in the method of constructing and preparing the electrodes, as will be hereinafter more fully described, and pointed out in the claims.

In the accompanying drawings, Figure 1 is a perspective view of a cell containing four electrodes constructed in accordance with my invention, a portion of the cell being broken away to expose the contents to view. Fig. 2 is a plan view of one electrode, and Fig. 3 is an elevation of one of the plates which are used in pairs to form the electrodes. Fig. 4 is a vertical transverse section through a completed electrode.

1 represents the cell, and 2 the electrode, said electrode having a central space or recess 3, a large number of closely-arranged perforations 4, and an upwardly-projecting lug 5, having a head 6, with horizontal perforations 7, for the passage of a wire 8, and a binding-screw 9, adapted to impinge on said wire, and the electrode is supplied with a filling 14 of active material which is poured into the central recess 3, filling the same, together with perforations 4.

The electrode is constructed by casting lead plates 12, with ribs or flanges 13, around three edges and the perforations 3, of a conical shape through said plates and having the smaller opening on the side opposite the flanges, then taking two of said plates, placing their flanges together, so that the central chamber or recess 3 is formed, and soldering the three meeting flanges together. The lug or projection 5 is formed integrally with the plate. After the shell of the electrode is formed as above, the central recess of the same with its tapering openings is filled by pouring in the active material 14, after which is inserted a tamping 15, which may consist of a strip of lead, in the top opening. A filling of dry oxide of lead is used for forming the positive electrode, and dry peroxide of lead for forming the negative electrodes. After a sufficient number of the respective electrodes are thus produced, the battery may be set up by placing the electrodes alternately in a cell which is supplied with a liquid composed of one (1) part sulphuric acid and two (2) parts of water, or any other suitable solution, and the lugs are connected in any well-known manner, after which the battery is ready for use.

In casting independent plates having the flanges or ribs and perforations, the parts may be made more perfectly and economically than if an entire integral support-plate is cast, and in joining said plates together a shell is formed which is less apt to warp. Moreover, a cheap and durable electrode is formed having an increased capacity for holding an active material, and adapted to prevent the active material becoming disintegrated or knocked off from the support-plates.

To provide against displacement, ordinary ribs may be formed in the bottom of the cell, making spaces into which the respective electrodes may be placed while their upper ends may be properly spaced by the connecting-wire which is passed through all the lugs and secured by set-screws.

Having thus described my invention, the following is what I claim as new therein and desire to secure by Letters Patent:

1. A secondary-battery element constructed of two perforated plates, each having transverse flanges on three edges of one face, corresponding flanges on said plates being secured together to unite the plates and form a central recess open at top, said central recess being filled with an active material, and said opening at top being closed by a suitable tamping.

2. In an electrode for secondary batteries, the combination of an electrode-shell formed from two plates, each having three flanges on three edges of one face, said plates being united by securing the corresponding flanges on the plates together, and an active material applied within the shell, in substantially the manner herein set forth.

3. A shell for electrodes, comprising two corresponding plates, each having flanges on three sides of one face, said plates being united to form a central space open at top by securing together corresponding flanges on the respective plates.

BOYD ANDERSON.

Witnesses:
C. R. MESTON,
C. J. BRINER.